Jan. 20, 1925.  1,523,856

O. BEST

APPARATUS FOR TREATING FLUIDS UNDER PRESSURE WITH CHEMICALS

Filed May 26, 1923  2 Sheets-Sheet 1

INVENTOR.
O. Best
BY
Watson E. Coleman
ATTORNEY.

Jan. 20, 1925.
O. BEST
1,523,856
APPARATUS FOR TREATING FLUIDS UNDER PRESSURE WITH CHEMICALS
Filed May 26, 1923    2 Sheets-Sheet 2
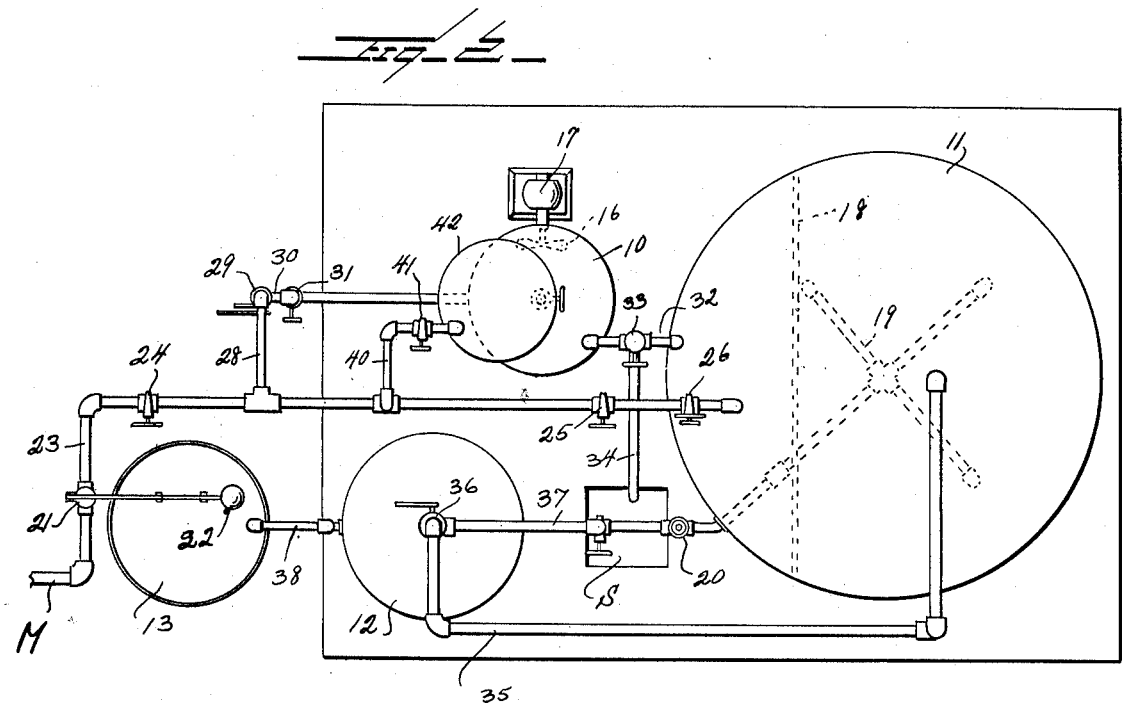
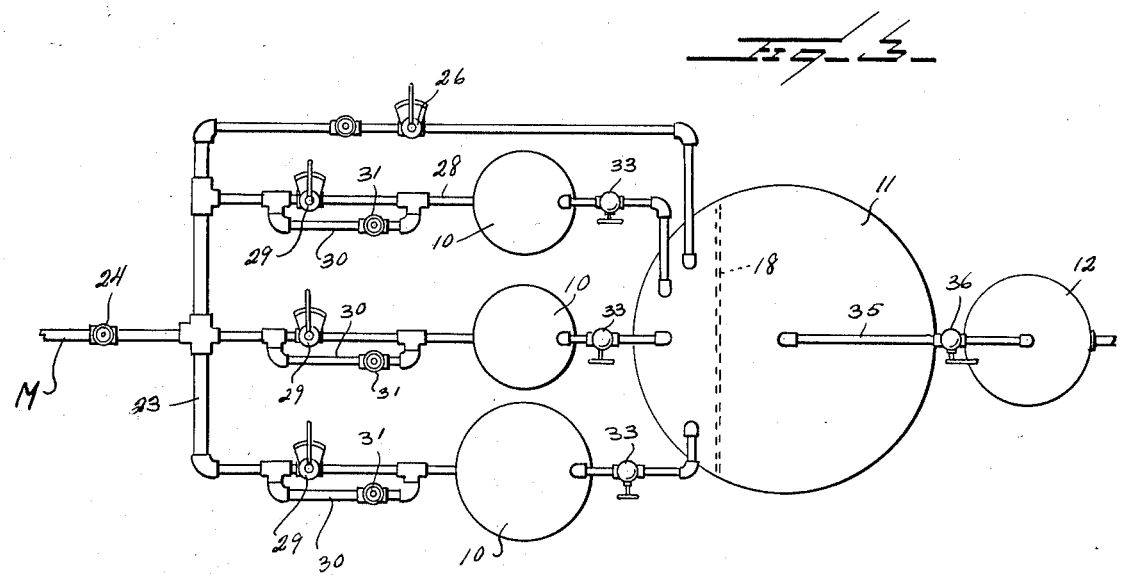
INVENTOR.
O. Best
BY Watson E. Coleman
ATTORNEY.

Patented Jan. 20, 1925.

1,523,856

UNITED STATES PATENT OFFICE.

OTTO BEST, OF SAN FRANCISCO, CALIFORNIA.

APPARATUS FOR TREATING FLUIDS UNDER PRESSURE WITH CHEMICALS.

Application filed May 26, 1923. Serial No. 641,768.

*To all whom it may concern:*

Be it known that I, OTTO BEST, a citizen of the United States, residing at San Francisco, in the county of San Francisco and State of California, have invented certain new and useful Improvements in Apparatus for Treating Fluids Under Pressure with Chemicals, of which the following is a specification, reference being had to the accompanying drawings.

This invention relates to apparatus for treating fluids under pressure with chemicals.

An important object of the invention is to provide a device of this character which is extremely simple and which may be readily operated by the layman.

A further object of the invention is to provide an extremely simple apparatus for treating fluids under pressure with chemicals in which a desired proportion of chemical to the fluid is maintained at all times regardless of changes in the pressure of the fluid at the source.

A further object of the invention is to provide a device of this character in which treatment of the fluid may be varied as desired as, for example, in the treatment of water the water may be treated either to soften the same, purify the same, or to remove algæ therefrom, without any material change in the apparatus.

A further object of the invention is to provide a water softening apparatus of that type in which softening of the water is accomplished by the contact of the water with a chemical solution, so constructed and arranged that the proportioning of the chemical to the water is accomplished by the control of a single valve.

A further object of the invention is to provide in an apparatus of this character, wherein the water after being softened is filtered, a construction and arrangement such that the use of a pump between the settling or water softening tank and the filter is unnecessary.

A still further object of the invention is to provide a device of this character which may be very cheaply produced and readily installed and which is durable and efficient in service.

These and other objects I attain by the construction shown in the accompanying drawings, wherein for the purpose of illustration is shown a preferred embodiment of my invention and wherein:—

Figure 2 is a plan view thereof; and

Figure 3 is a fragmentary diagrammatic plan of a multiple apparatus by means of which a plurality of chemicals may be fed either alternately or simultaneously.

Figure 1:
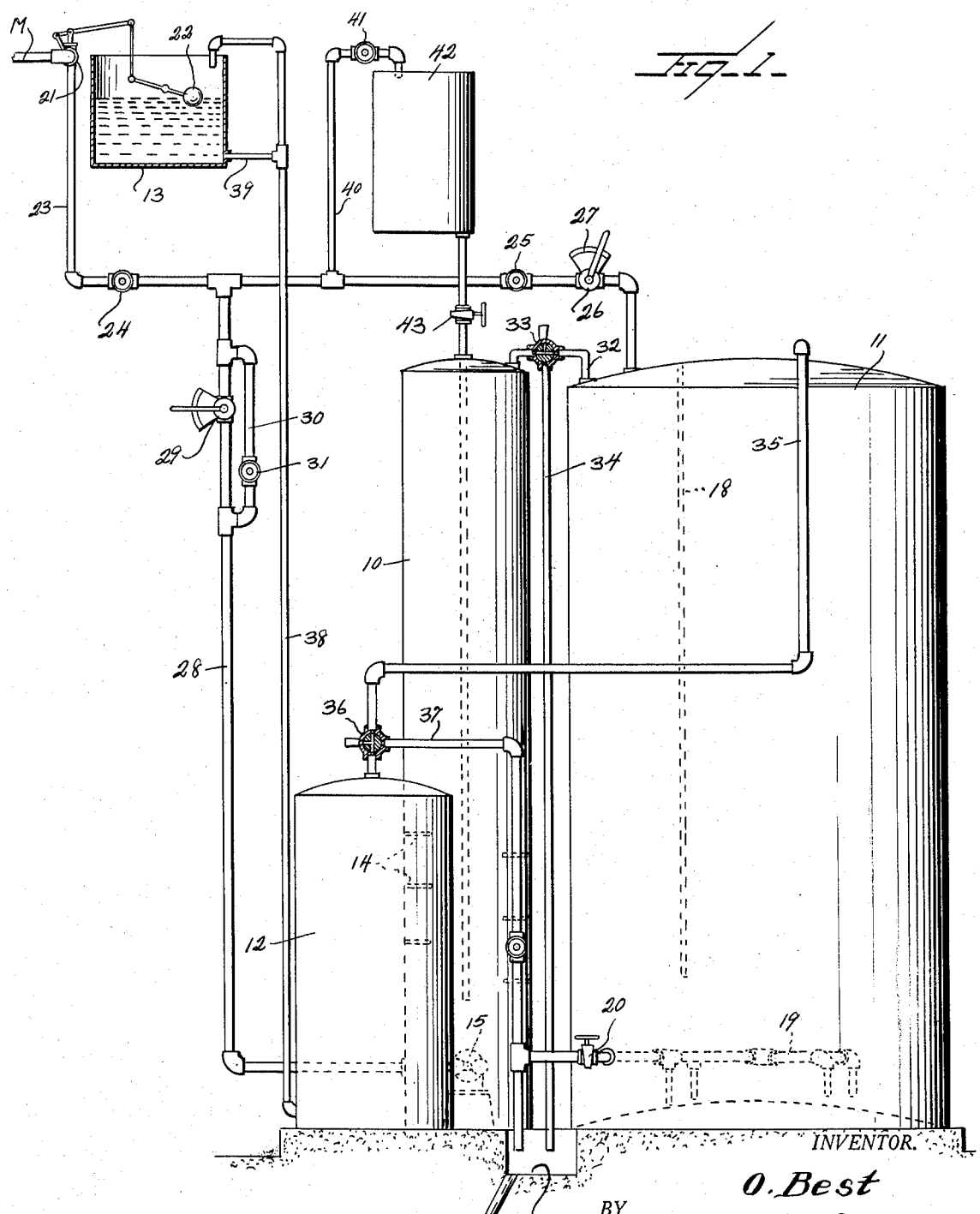
Figure 1 is a side elevation partially in section and partially diagrammatic showing apparatus constructed in accordance with my invention.

Referring now more particularly to the drawings, the numeral 10 indicates a chemical tank, 11 a settling tank, 12 a filter and 13 a storage tank. The chemical tank 10 is preferably provided adjacent its lower end with a plurality of baffles 14 and at its extreme lower end with an agitator 15, shown in the present instance as comprising a propeller 16 mounted upon the armature shaft of a motor 17, the armature shaft being directed through the wall of the tank 10. The settling tank 11 is provided adjacent one side thereof with a baffle 18 extending from the top of the tank to a point adjacent the lower end thereof. In its lower end the tank 11 is provided with a sludge discharge device 19, the discharge of which is controlled by a valve 20 disposed exteriorly of the tank. This discharge leads to any suitable receptacle such as the sewer S. The filter 12 is of any suitable construction.

M indicates a fluid supply main having disposed therein a feed valve 21 controlled by a float 22 within the fluid storage tank 13 and closing the main when water within the tank 13 rises to a predetermined level. This main is connected by a pipe 23 leading from the valve 21, with the tank 11 at the top and at one side of the baffle 18 and this pipe has disposed therein a pair of spaced cut-off valves 24 and 25. Between the cut-off valve 25 and the tank 11 a control valve 26 is disposed in the pipe 23, this valve preferably being provided with a dial 27 over which its operating handle ranges. A branch pipe 28 connects with the pipe 23 intermediate the valves 24 and 25 and with the lower end of the chemical tank 10. This pipe has arranged therein a control valve 29 similar to the valve 26, which is by-passed by a pipe 30, having arranged therein a cut-off valve 31 which is normally closed. The upper end of the chemical tank 10 is connected with the upper end of the tank 11 at the same side of the baffle 18 as the pipe 23 by a pipe 32 having arranged therein a three-way valve 33, by means of which the upper end of the chemical tank 10 may be placed in communication, either with the tank 11 or through pipe 34 with the sewer S. From the tank 11 at the opposite side of baffle 18 from the pipes 32 and 23, a pipe 35 leads, the opposite end of which is connected with the upper end of the filter 12. Adjacent the filter 12 the pipe 35 has arranged therein a three-way valve 36, by means of which communication may be established between the tank 11 and the filter or between the filter 12 and sewer S by a pipe 37.

The storage tank 13 is preferably arranged at a point considerably above the filter 12 and is connected with the discharge of the filter 12 by a pipe 38 discharging into the upper end of the storage tank and communicating with the lower end of the storage tank through a branch pipe 39. Between the cut-off valves 24 and 25 and the pipe 23 a branch pipe 40 communicates with the pipe 23, this branch pipe 40 having arranged therein a cut-off valve 41 and discharging directly into a chemical charge forming tank 42. This tank has a valved outlet extending into the chemical tank 10 adjacent the lower end thereof, indicated at 43.

In the operation of the device the chemical tank 10 is provided with an excess charge of some water softening chemical, as for example, lime: accordingly, water entering this tank through the pipe 28 will come in contact with water already within the tank and having in suspension therein this chemical, this chemical being continually agitated by the propeller 16. Water from the pipe 28 enters the tank 10 at the lower end and in passing upwardly through the water already in the tank 10 is converted to a saturate solution of the chemical, which is directed from the upper end of the tank 10 into tank 11 at one side of the baffle 18. Simultaneously, water from the main is entering the tank 11 at the same side of the baffle and mingles with the water from the tank 10, with the result that a chemical reaction takes place resulting in precipitation of a solution of the chemical and a large proportion of the sediment contained in the water from the main. This precipitate passes with the water below the lower end of the baffle 18 and is practically all dropped at the bottom of the tank 11. The water passing upwardly at the opposite side of the baffle discharges from the tank 11 into the filter 12. Attention is directed to the fact that the water within both of the tanks 10 and 11 is under the pressure of the main M and accordingly this pressure will be applied to force the water leaving the tank 11 through the bed of the filter 12 where any remaining impurities therein will be deposited. The water from the filter is led directly to the storage tank 13 and when the level of water within this tank reaches a predetermined degree the main is shut off automatically shutting down the entire apparatus. Particular attention is directed to the fact that because of the peculiar location of the control valves 26 and 29, once these valves have been set for a particular water condition there is no necessity for changing these valves due to any change in the pressure from the main M, since the flow through these valves will be exactly proportional regardless of the main pressure at all times. If for any reason a slightly higher proportion of chemical is necessary for a period of short duration, this additional chemical may be readily had by opening the valve 31 to permit the desired excess of water to the tank 10 to by-pass the valve 29 thus accomplishing the result desired without disturbing the setting of the valves 27 and 29. At such times as it is necessary to recharge the chemical tank 10 the valve 41 is opened to partially fill the tank 42 and the mixture is formed in this tank, the valve 41 is then closed together with the valve 24 and the three-way valve 33 is positioned to connect the upper end of the tank 10 with the sewer. The valve 43 of the connection between the tank 42 and tank 10 is then opened to permit the contents of this tank to pass into the tank 10, these contents displacing an equal amount of lime water which will pass through the pipe 34 to the sewer. After the tank 42 is emptied the valve 43 is closed, the valve 33 is positioned to connect the tanks 10 and 11 and the valve 24 again opened. When it is desired to cleanse the filter this may be readily accomplished by positioning the three-way valve 36 to connect the upper end of the filter with the sewer, at which time the pressure head from the tank 13 will cause the water from this tank to be forced upwardly through the filter bed to cleanse the same, the discharge passing to the sewer.

If desired, a plurality of chemical tanks may be employed, as suggested in Figure 3. In this figure I have shown three chemical tanks 10, each having connections with the pipe 23, similar to the connections in Fig. 1. These tanks may be operated singly or in conjunction, a desired proportion of the chemical from each tank being fed to the tank 11 and these tanks may contain either the same chemical or a different chemical, as desired. Here again attention is directed to the fact that the feed to each of the tanks, if all are simultaneously employed, will be proportional at all times irrespective of the main pressure.

While I have above described the use of the apparatus for softening water it will, of course, be obvious that by the use of different chemicals in the chemical tank or tanks, the same may be employed for a wide range of uses. For instance, the chemical may be combined with the water for the destruction of bacilli contained therein, or, a chemical may be added which will purify the same, nor is the use of the device limited to the treatment of water for the same may be employed for treating other fluids with equal facility.

It will, of course, be obvious that the structure hereinbefore described is capable of some change and modification particularly as to the manner of arrangement of the various tanks and connections herein employed and I accordingly do not limit myself to such specific structure as hereinbefore set forth and illustrated except as hereinafter claimed.

I claim:—

1. In apparatus for treating fluids under pressure other than that generated within the apparatus with chemicals, a closed settling tank having a baffle extending from its top to a point adjacent the bottom thereof, a conduit in communication with a source of fluid under pressure and with the upper end of said tank at one side of said baffle, a branch connected between said source and the upper end of said tank at the same side of the baffle including means for saturating fluid passing therethrough with a chemical.

2. In apparatus for treating fluids under pressure other than that generated within the apparatus with chemicals, a closed settling tank having a baffle extending from its top to a point adjacent the bottom thereof, a conduit in communication with a source of fluid under pressure and with the upper end of said tank at one side of said baffle, a branch connected between said source and the upper end of said tank at the same side of the baffle including means for saturating fluid passing therethrough with a chemical, a valve in said conduit and a valve in said branch between said means and said source.

3. In apparatus for treating fluids under pressure other than that generated within the apparatus with chemicals, a closed settling tank having a baffle extending from its top to a point adjacent the bottom thereof, a conduit in communication with a source of fluid under pressure and with the upper end of said tank at one side of said baffle, a branch connected between said source and the upper end of said tank at the same side of the baffle including means for saturating fluid passing therethrough with a chemical, a valve in said conduit, and a valve in said branch between said means and said source and a valved by-pass about the valve of said branch.

4. In apparatus for treating fluids under pressure other than that generated within the apparatus with chemicals, a closed settling tank having a baffle extending from its top to a point adjacent the bottom thereof, a conduit in communication with a source of fluid under pressure and with the upper end of said tank at one side of said baffle, a branch connected between said source and the upper end of said tank at the same side of the baffle including means for saturating fluid passing therethrough with a chemical, a filter, a conduit connecting the upper end of the tank at the opposite side of the baffle and the filter and a sludge removing device in the bottom of said tank.

5. In apparatus for treating fluids under pressure other than that generated within the apparatus with chemicals, a closed settling tank having a baffle extending from its top to a point adjacent the bottom thereof, a conduit in communication with a source of fluid under pressure and with the upper end of said tank at one side of said baffle, a branch connected between said source and the upper end of said tank at the same side of the baffle including means for saturating fluid passing therethrough with a chemical, a storage tank, a connection between the settling tank at the opposite side of the baffle and the storage tank, including a filter and means in the storage tank for controlling the supply from said source.

6. In apparatus for treating fluids under pressure other than that generated within the apparatus with chemicals, a closed settling tank having a baffle extending from its top to a point adjacent the bottom thereof, a source of fluid under pressure, a conduit connecting said source and said tank at one side of said baffle, a pair of cut-off valves arranged in space relation in said conduit, a third valve arranged adjacent the tank and constituting a dial valve, a branch connection connecting said conduit intermediate said cut-off valves with said tank and including means for saturating fluid passing therethrough with a chemical, a dial valve arranged within said branch and a valve controlled by-pass for the last named dial valve.

7. In apparatus for treating fluids under pressure with chemicals and in combination, a closed settling tank having a baffle therein extending from its top to a point adjacent the bottom thereof, a chemical tank having horizontal baffles therein adjacent its lower end and connected at its upper end with said settling tank at one side of the baffle, an agitator arranged at the bottom of said tank, a source of fluid under pressure, a connection between the source and the lower end of said chemical tank including a valve and a connection between the source and said settling tank at the same side of the baffle as the connection between the chemical and settling tanks and likewise including a control valve.

8. In apparatus for treating fluids under pressure with chemicals and in combination, a closed settling tank having a baffle therein extending from its top to a point adjacent the bottom thereof, a chemical tank having horizontal baffles therein adjacent its lower end and connected at its upper end with said settling tank at one side of the baffle, an agitator arranged at the bottom of said tank, a source of fluid under pressure, a connection between the source and the lower end of said chemical tank including a valve and a connection between the source and said settling tank at the same side of the baffle as the connection between the chemical and settling tanks and likewise including a control valve, a charging tank arranged above said chemical tank, a valved discharge for said charging tank terminating interiorly of said chemical tank and adjacent the lower end thereof and a valve in the connection between the chemical and settling tanks positionable to connect the chemical and settling tanks or the chemical tank with a waste pipe.

In testimony whereof I hereunto affix my signature.

OTTO BEST.